United States Patent [19]

Kramer

[11] 4,050,570
[45] Sept. 27, 1977

[54] CAN ORIENTING DEVICE
[75] Inventor: Norman C. Kramer, North Hollywood, Calif.
[73] Assignee: Carnation Company, Los Angeles, Calif.
[21] Appl. No.: 692,855
[22] Filed: June 4, 1976
[51] Int. Cl.² .......................................... B65G 47/84
[52] U.S. Cl. .................. 198/398; 198/417; 198/441
[58] Field of Search ............... 198/388, 398, 399, 402, 198/417, 441, 480

[56] References Cited
U.S. PATENT DOCUMENTS

| | | | |
|---|---|---|---|
| 2,670,077 | 2/1954 | Drew | 198/388 X |
| 2,714,439 | 8/1955 | Prickett et al. | 198/388 X |
| 2,787,359 | 4/1957 | Gerecke | 198/441 |
| 2,984,337 | 5/1961 | Couch et al. | 198/441 |
| 3,098,552 | 7/1963 | Schulz | 198/441 X |
| 3,441,120 | 4/1969 | McGill | 198/441 |
| 3,782,526 | 1/1974 | Simons | 198/399 X |

Primary Examiner—Evon C. Blunk
Assistant Examiner—Richard K. Thomson
Attorney, Agent, or Firm—Eugene C. Ziehm; Robert D. Kummel

[57] ABSTRACT

A device for orienting filled and seamed two piece cans, in which a single line of randomly oriented cans is divided into two lines, all of the cans in one line being oriented in an upright position and all of the cans in the other line being oriented in an inverted position. The cans in one of the lines are then inverted and the lines combined to provide a single stream of cans oriented in one direction.

The device has a rotatable turret body having a plurality of can receiving pockets around its periphery. A lever arm is pivotally mounted above each of the pockets and is adapted to engage the seamed end of the can in the pocket when the outer end of the lever arm is pivoted to a horizontal position. Cam means are provided to pivot the outer end of the lever arm from an elevated position to a horizontal position while the can is carried from a point adjacent a can inlet chute on a short arcuate path to one of a pair of can outlet chutes. Cans which are in an inverted position in the pocket are not engaged by the lever arm and pass to the other outlet chute to thereby separate cans which are in an inverted position from those which are in an upright position.

7 Claims, 6 Drawing Figures

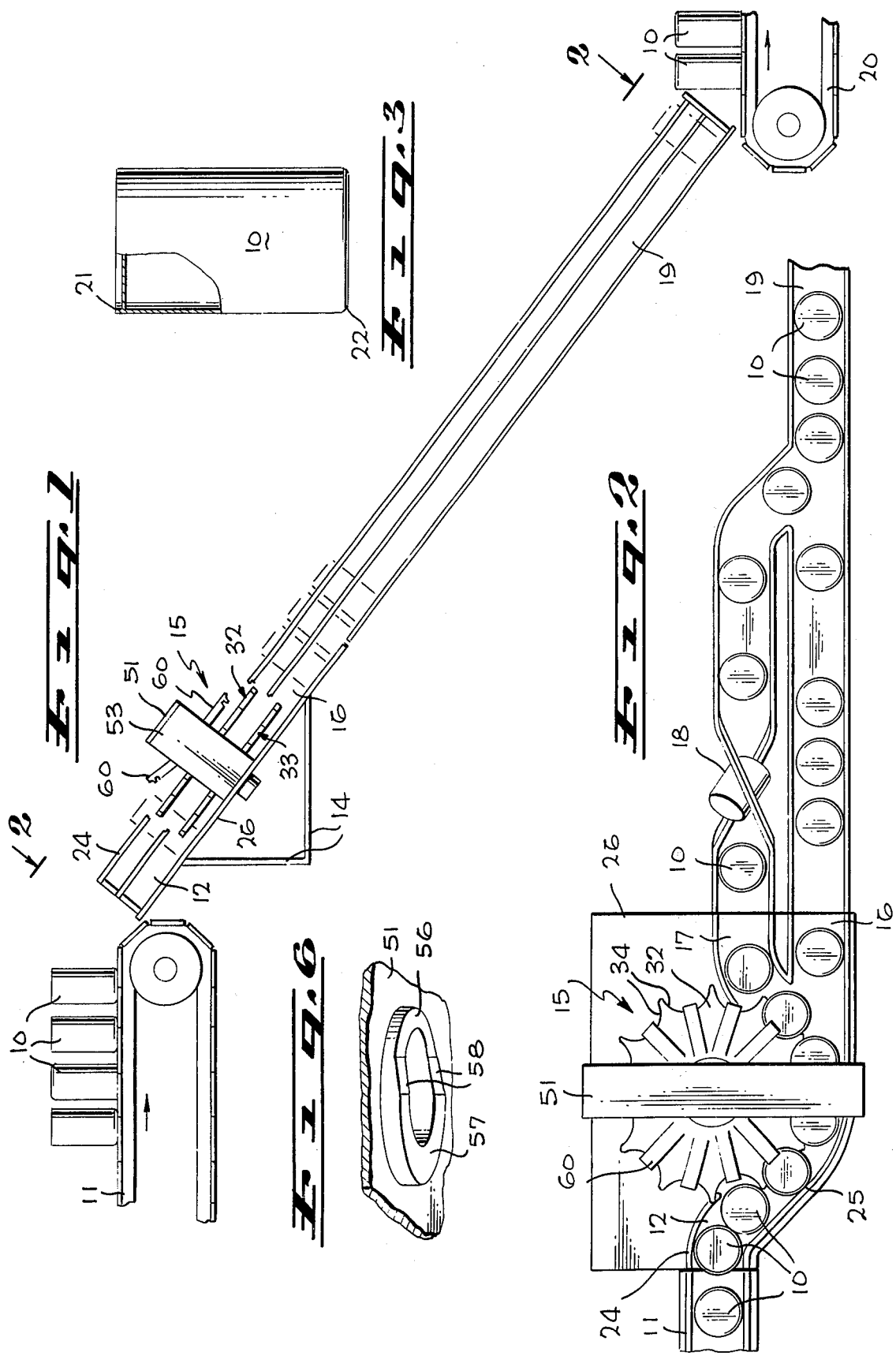

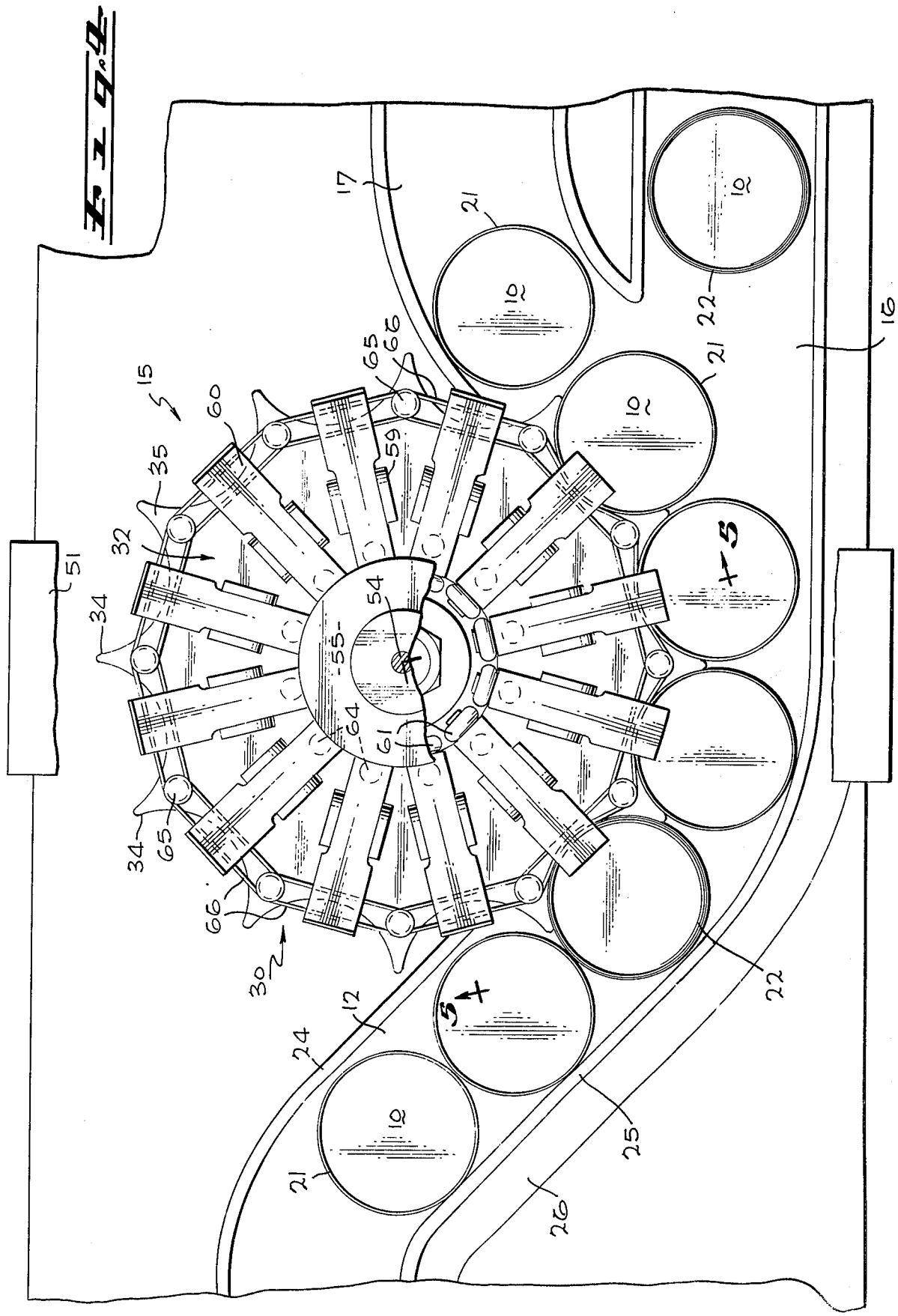

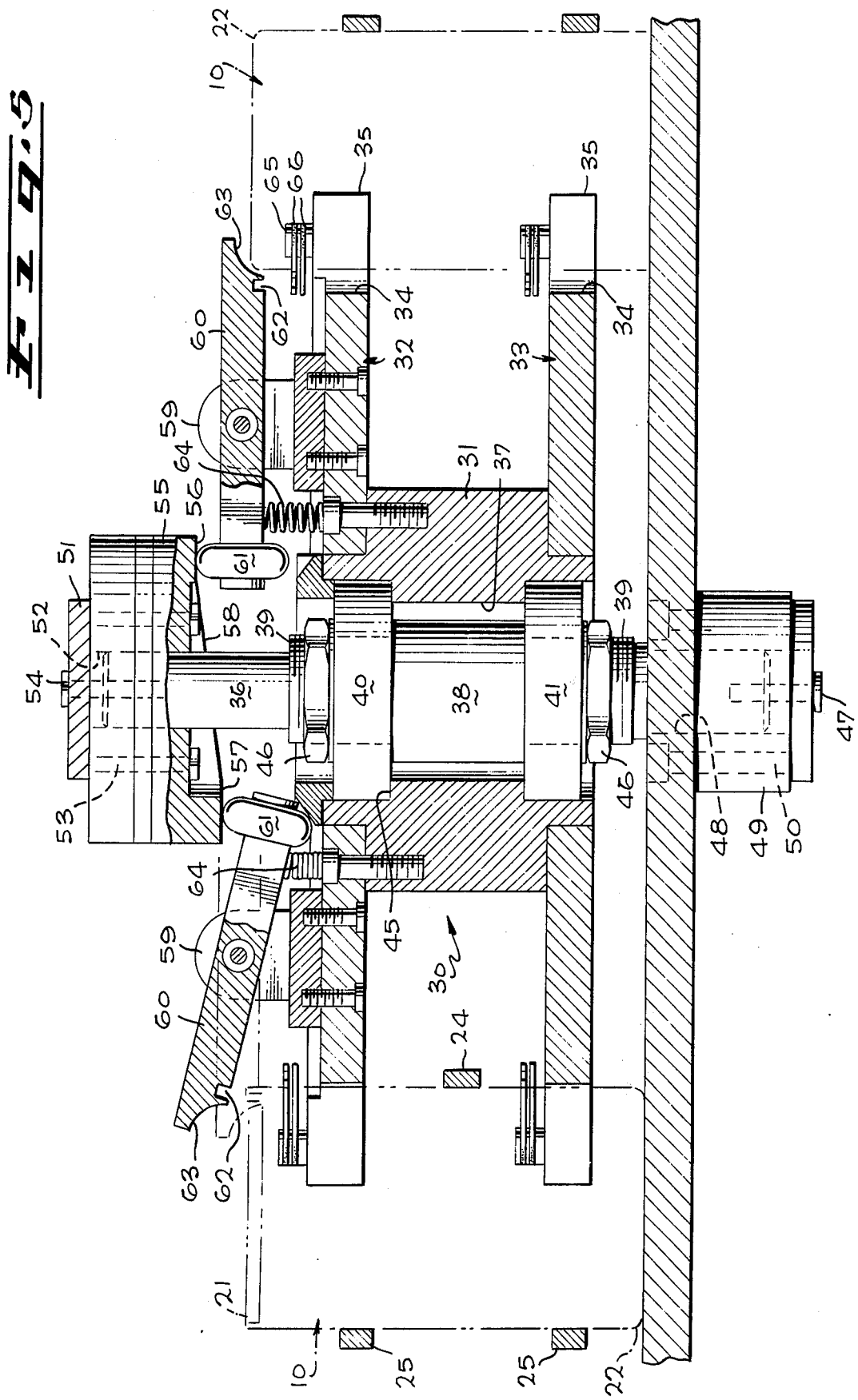

CAN ORIENTING DEVICE

BACKGROUND OF THE INVENTION

This invention relates to apparatus for receiving randomly oriented containers and orienting the containers in a single direction. More particularly, the invention relates to apparatus which receives filled and seamed cans delivered by a conveyor, cable or chute in both inverted and upright positions and delivers the cans, oriented in a single direction, to another conveyor, cable or chute for further processing such as labeling, packaging, etc.

In recent years the use of two-piece cans is becoming more widespread throughout the food industry. Such cans have the bottom and side walls drawn or drawn and ironed from a single piece of metal and have the top secured thereto by a seam. As a result, the top and bottom ends of such cans differ in shape and appearance. Only the top end of the can is provided with a seam or rim formed by the cover securing means, while the bottom end of the can is rounded.

In practice, the cans are filled and seamed and are then retorted to ensure sterility of the contents. In one retorting procedure, cans are carried in the retort in large baskets and are in scrambled or non-uniform positions in the baskets. After retorting, the cans are dumped from the baskets onto a chute or conveyor by means of which they are carried to label applying machinery. Because of the difference in the shape and appearance of the ends of two-piece cans, it is necessary that the cans be presented to the labeling machine with the tops of the cans oriented in one direction, either all in an upright position or all in an inverted position on the conveyor, so that the labels may be applied uniformly at one end of the can.

SUMMARY OF THE INVENTION

The present invention provides a device for orienting cans which receives randomly oriented filled and seamed two piece cans and separates the cans into two lines, with all of the cans in one line being oriented in an upright position and all of the cans in the other line being oriented in an inverted position. The cans in one of these lines are then inverted and the two lines combined to provide a single stream of cans aligned in a single direction.

The can oriented device of this invention comprises a rotatable turret body which carries filled and seamed cans from a can inlet chute to a pair of can outlet chutes. The turret body has a plurality of can receiving pockets around its periphery. Pivotally mounted lever means are provided above each of the pockets on the turret body, the lever means being adapted to engage the seamed end of the can and hold the can in the pocket when the outer end of the lever is pivoted to a horizontal position. Cans which are in the pockets in an inverted position are not engaged by the lever. Cam means are provided to pivot the outer end of the lever from a raised position to a horizontal position while the can is carried from a point adjacent the can inlet chute to a point adjacent one of the pair of can outlet chutes.

All of the cans in the inlet stream which are in an upright position will be carried by the turret body to one of the outlet chutes, and all of the cans which are in an inverted position will pass to the other outlet chute. Cans in one of these outlet chutes are then inverted and the chutes combined, to provide a single stream of cans aligned in a single direction.

BRIEF DESCRIPTION OF THE DRAWINGS

In the Drawings

FIG. 1 is a side elevation showing the can orienting device of the present invention.

FIG. 2 is a top plan view taken along line 2—2 of FIG. 1.

FIG. 3 is a side elevation, partly in section, of a conventional two-piece can.

FIG. 4 is an enlarged top plan view of the can orienting device.

FIG. 5 is a sectional view taken along line 5—5 of FIG. 4.

FIG. 6 is a perspective view of one embodiment of the cam used in the can orienting device of this invention.

DESCRIPTION OF THE PREFERRED EMBODIMENT

As shown in the drawings, filled and seamed cans are carried by a first conventional endless conveyor or cable 11 and are discharged therefrom onto an inlet chute 12 which feeds the cans in randomly oriented positions to the can orienting device 15 of this invention, which is supported by brackets 14 secured to a suitable base. The cans 10 are conventional two-piece cans, having a rim 21 at the seamed top end and a rounded bottom edge 22. A pair of can outlet chutes 16 and 17 receive the cans from can orienting device 15. Cans which are fed to the orienting device 15 in an inverted position, that is, with the seamed end down, pass to outlet chute 16, while cans fed to the orienting device 15 in an upright position are carried in a short arcuate path to outlet chute 17. Cans in one of the outlet chutes are inverted, as at 18, and the chutes combined into a single discharge line 19 in which all of the cans are oriented in the same direction, that is, all of the cans are either upright or all are inverted. The cans thus oriented are transferred to a second conventional endless conveyor or cable 20 on which they are carried for further processing, such as to a labeling machine (not shown).

While FIG. 2 shows the inversion 18 of cans in outlet chute 17, it will be understood that cans in either outlet chutes 16 or 17 may be inverted prior to the combination of these two chutes, depending on whether the cans are to be presented to the labeling machine in an inverted or upright position. Thus, if it is desired the the cans be presented to the labeling machine in an inverted position, cans in outlet chute 17 go through an inversion of the cans while the cans in outlet chute 16 do not. However, if it is desired that the cans be presented to the labeling machine in an upright position, the cans in outlet chute 16 go through an inversion of the can while those in outlet chute 17 do not.

As shown in FIG. 1, it is generally preferred that the second endless conveyor 20 be positioned below the first endless conveyor 11, with the inlet chute, can orienter and outlet chutes being disposed at an angle between the two conveyors, say between about 25° and 60°. In this manner the weight of the filled cans is sufficient to operate the can orienting device 15 so that motor means are not required to drive the orienter. The angle at which the can orienting device and the chutes are disposed in relation to the conveyors is not critical as long as the weight of the filled cans fed to the orienting device is sufficient to cause rotation of the orienting device 15. Of course, the conveyors 11 and 20 may both be on the same level if desired, in which case motor means are provided to operate the can orienting device.

Referring now more particularly to FIGS. 4 and 5, randomly oriented cans are discharged from feed conveyor 11 onto inlet chute 12 which preferably is formed of laterally spaced guide rails 24 and 25 which confine the cans to a predetermined path of travel. The cans are supported on base member 26, which is secured in position by any suitable means such as brackets 14 (FIG. 1). Cans leaving the inlet chute 12 are received in a rotating turret body 30 which extends partially over the inlet chute, the turret body including a substantially cylindrical hub 31 and a pair of vertically spaced horizontally disposed starwheel plates 32 and 33 mounted on the upper and lower ends, respectively, of the hub 31. Both of the starwheel plates are substantially the same having a plurality of uniformly spaced, arcuate can-receiving pockets 34 disposed around the periphery thereof, the pockets being separated from each other by toothlike spurs 35. The arcuate pockets 34 of the upper starwheel plate 32 are aligned with the arcuate pockets 34 or the lower plate 33. The vertical spacing between the plates is such that the pockets will engage the side wall of a can adjacent the upper and lower ends thereof when the can is seated on the base 26.

Stationary shaft member 36 is disposed within an axially extending elongated bore 37 which extends through the hub 31. The shaft 36 has an enlarged central section 38 intermediate the ends thereof, with threads 39 being provided at both the upper and lower ends of the enlarged section. Bearings 40 and 41 are disposed between the hub 31 and the shaft 36 to permit the hub to rotate freely around the stationary shaft. The bearings 40 and 41 rest on annular shoulders (not shown) provided on the shaft adjacent the upper and lower ends of the enlarged central section 38, and on annular shoulders 45 adjacent the upper and lower ends of the hub 31. Vertical displacement of the shaft 36 relative to the hub 31 is prevented by locking nuts 46 on each end of the enlarged section 38.

The lower end of shaft 36 extends through opening 48 in the base 26 and is supported against lateral movement by cylindrical cup member 49 which is secured against the underside of the base by a plurality of screws 50. Screw 47 extends through the base of cup member 49 into the base of shaft 36 to hold the shaft securely in position.

The upper end of shaft 36 is mounted within bore 52 which extends through upper supporting bracket 51 to prevent lateral movement of the shaft and is held securely in position by screw 54. Bracket 51 is secured to a pair of side supporting brackets 53, which are attached to the base 26 by any suitable means. A stationary cylindrical cam member 55 is secured to the underside of upper supporting bracket 51, such as by screws. As shown in FIG. 6, the surface of the cam has a contoured profile having a low dwell section 56, a high dwell section 57 and rise portions 58 extending therebetween. The low dwell section 56 extends around the circumference of the cam a distance at least equal to the distance the turret body 30 rotates as it passes from about a point at the midpoint of inlet chute 12 to about a point at the midpoint of outlet chute 17, usually between about 70° to 90°.

Mounted on the upper surface of starwheel plate 32 are a plurality of bifurcated brackets 59 with a bracket being secured adjacent each of the pockets 34 in the starwheel. Pivotally connected to each of the brackets is a medial portion of a lever arm 60, the inner end of which extends to a point below cam 55 and has a cam follower 61 secured at the end thereof adapted to roll over the contoured surface of the cam. thereof. The outer end of the lever arm 60 extends into the center of the adjacent can receiving pocket 34 a distance sufficient to permit the notch or groove 62 provided in the lower surface of the lever arm adjacent its outer end, to engage the seamed end or rim 21 of a can disposed in the pocket when the outer notched end of the lever arm is in a substantially horizontal position. Thus, the inner edge of notch 62 is substantially aligned with the inner edge of the adjacent can receiving pocket 34 when the lever arm is in a substantially horizontal position. The outer end of the lever arm is provided with a rounded concave surface 63 adapted to urge cans which are in an inverted position, out of the pocket. A compression spring 64 is positioned between starwheel plate 32 and the lower surface of the lever arm at a point between the bracket 59 and the cam follower 61 so that the outer end of the lever arm is biased in a depressed position.

As shown in FIG. 5, the stationary cam member 55 is vertically positioned such that when the cam follower 61 is on the high dwell section 57, the inner end of the lever arm is depressed causing the outer end of the lever arm to be raised. When the cam follower rolls onto the low dwell section 56, the compression spring 64 urges the cam follower into continued contact with the cam surface causing the lever arm to be pivoted into a position substantially parallel to the plane of the starwheel plate. Thus, as the cam follower 61 rolls from the high dwell portion 57 to the low dwell portion 56 of the cam, the outer notched end of the lever arm 60 is pivoted from an elevated position to a substantially horizontal position at which point the notch 62 is positioned to engage the seamed end or rim of a can in the adjacent pocket of the starwheel.

According to a preferred embodiment of the invention, posts 65 are secured on the upper or lower surface of one or both of starwheel plates 32 and 33 adjacent each of the pockets 34. Resilient means 66 are stretched between adjacent pairs of posts 65 so that they extend across a portion of the can receiving pockets. The resilient means are capable of being deformed sufficiently to permit cans to fit snugly into the pockets and assist in urging the cans from the pockets when the outer end of the lever arm is in an elevated position.

In operation, as the randomly oriented cans slide down inlet chute 12 they press against the can receiving pockets 34 of the starwheel plates causing the turret body 30 to rotate in the direction shown in FIG. 4, and the cam followers 61 to roll over the contoured surface of the cam 55. At a point immediately prior to the rotation of a lever arm 60 past inner guide rail 24, the cam follower on that lever arm is on the high dwell section 57 of the cam so that the outer end of the lever arm is in an elevated position, as seen in the right-hand side of FIG. 5. As a lever arm is rotated past the inner guide rail the cam follower on that lever arm rolls over the rise section 58 from the high dwell section 57 onto the low dwell section 56 causing the outer end of that lever arm to be pivoted downwardly to a horizontal position substantially parallel to the plane of the starwheel plate. The cam follower on that lever arm remains on the low dwell section until the lever arm is rotated to a point immediately beyond first outlet chute 16. At this point the cam follower rolls onto the high dwell section causing the outer end of that lever arm to be pivoted to an elevated position. The cam follower remains on the high dwell section until that lever arm is rotated to a point immediately prior to crossing over inner guide rail 24, as described above.

In this manner, if a can passes from the inlet chute to the turret body in an upright position, the rim or seamed end on the top of the can is engaged by the notch on the underside of the lever arm when the outer end of the lever arm is pivoted downwardly to the horizontal position as seen in the dotted line portion on the left hand side of FIG. 5. The lever arm holds the can in the pocket and carries the can on a short arcuate path until the can has passed first outlet chute 16. At this point the inner end of the lever arm is depressed as the cam follower rolls onto the high dwell section of the cam, causing the outer end of the lever arm to be pivoted to an elevated position, thereby releasing the can, which passes into second outlet chute 17. If the can passes from the inlet chute to the turret body in an inverted position, that is, with the seamed end resting on the base, the notch on the lever arm does not engage the rounded bottom end of the can. Rather, the rounded concave end portion 63 of the lever contacts the rounded bottom end 22 of the can to push the can slightly out of the pocket. Thus the inverted can is not held in the pocket so that the can passes directly to first outlet chute 16. As discussed hereinabove, the cans in either outlet chutes 16 or 17 are then inverted, depending on the direction in which it is desired to present the cans to the labeling machine, and the two chutes combined to provide a single stream of cans oriented in a single direction.

It will be apparent that various changes may be made in the form construction and arrangement of the parts without departing from the spirit and scope of the invention, the form hereinabove described being a preferred embodiment thereof. For example, if desired, only a single starwheel plate may be utilized in the turret body. Also, as discussed hereinabove, if the first and second conveyors 11 and 20 and the can orienting device 15 are all positioned at the same level, motor means may be provided to rotate the turret body. In such a case, securing screws 47 and 54 are removed to permit shaft 36 to rotate freely and hub 31 is keyed to the shaft 36. Shaft 36 may be rotated by one or more drive belts secured to a conventional motor (not shown). If desired, sensing means may be provided in can inlet chute 12 to permit operation of such motor means and rotation of the turret body only when a solid head of cans is maintained in the inlet chute.

What is claimed is:

1. A can orienting device for use with cylindrical cans having a seamed top end and a rounded bottom edge which comprises a rotatable wheel having a plurality of can receiving pockets around its periphery, said wheel being adapted to receive cans from an inlet chute and rotatably carry said cans to one of a pair of outlet chutes laterally spaced about the axis of rotation of said wheel, the wheel being disposed substantially parallel to the base of said chutes lever means carried on said rotatable wheel and mounted for pivotal movement above each of said pockets, said lever means having a can contacting end portion which is adapted to be pivotally moved toward the can receiving pocket to engage the seamed top end of the cans and hold in the pockets those cans which are positioned on the inlet chute with the seamed top end adjacent the lever means, and to urge out of the pockets those cans which are positioned on the inlet chute with the rounded bottom edge adjacent the lever means, and means operatively connected to said lever means to maintain the can contacting end portion of the lever means in a can engaging position substantially parallel to said wheel when the lever means is rotatably carried on said wheel from the inlet chute to the outlet chute most remote from the inlet chute around the axis of rotation of the wheel and to pivotally move the lever means out of a can engaging position when the lever means is rotatably carried from said outlet chute to said inlet chute whereby cans received in the pockets of said wheel with the rounded bottom edge of the can adjacent the lever means are urged out of the pocket and are carried by the wheel to a first outlet chute, while cans received in the pockets of said wheel with the seamed top end of the can adjacent the lever means are held in the pocket by the lever means and carried to a second outlet chute more remote from the inlet chute around the axis of rotation of the wheel.

2. The device of claim 1 in which the lever means comprises a rigid arm radially extending above and pivotally mounted on said rotatable wheel adjacent each of the can receiving pockets, with the outer end of the rigid arm extending above the center of the can receiving pocket, said outer end having a rounded concave surface portion adapted to urge out of the pockets those cans which are positioned on the inlet chute with the rounded bottom edge adjacent the lever means, and a can seam-engaging notch adjacent the concave portion to hold in the pockets those cans which are positioned on the inlet chute with the seamed top end adjacent the lever means, the inner edge of said can seam-engaging notch being substantially aligned with the inner edge of the can receiving pocket above which it is disposed when the outer end of the lever means is pivotally moved to a position substantially parallel to said rotatable wheel.

3. The device of claim 2 in which the rigid arm is pivotally mounted on the rotatable wheel at a point intermediate the inner and outer ends of the arm and said means operatively connected to said lever means includes cam follower means mounted on the inner end of said rigid arm, cam means fixedly mounted above the cam follower means and having a contoured profile over which the cam follower means rolls, and spring means adjacent said cam follower means to bias the cam follower means into contact with said cam means and the lever means into a can engaging position.

4. The device of claim 3 in which the contoured profile of the cam means is such that the outer end of each rigid arm is pivoted to a can engaging position substantially parallel to said rotatable wheel as the rigid arm is rotatably carried past said inlet chute, is maintained in such can engaging position until the rigid arm is rotatably carried past a first outlet chute to a second outlet chute, is pivoted to an elevated can-releasing position as the rigid arm is rotatably carried beyond said second outlet chute and is maintained in such elevated position until th rigid arm is rotatably carried to the inlet chute.

5. The device of claim 1 in which the rotatable wheel includes at least one horizontally disposed star wheel plate having a plurality of can receiving pockets around its periphery and a cylindrical hub on which the star wheel plate is mounted for rotation, said star wheel plate being substantially parallel to the base of the inlet and outlet chutes.

6. The device of claim 1 in which the rotatable wheel comprises a substantially cylindrical hub, and a pair of vertically spaced, parallel, horizontally disposed star wheel plates mounted for rotation on said hub, both of said star wheel plates having a plurality of can receiving pockets around their periphery, with the pockets of both plates being aligned, and said lever means comprises a rigid arm radially extending above and pivotally secured to the upper surface of the upper star wheel plate adjacent each of the can receiving pockets, the outer end of said rigid arm extending above the center of the can receiving pocket and having a rounded concave surface portion and a can seam-engaging notch in the lower surface of the arm adjacent the concave portion, the rigid arm being pivotally secured to said star wheel plate at a point intermediate the inner and outer ends of the arm so that the outer end of the arm may be pivotally moved downwardly toward the can receiving pocket into contact with a can in said pocket and upwardly out of contact with a can in said pocket.

7. The device of claim 1 in which means for inverting cans is provided in one of said outlet chutes.

* * * * *